(12) United States Patent
Wang et al.

(10) Patent No.: US 8,729,173 B2
(45) Date of Patent: May 20, 2014

(54) AQUEOUS POLYMER DISPERSIONS MODIFIED WITH SOLVENT-SOFTENED NANOPARTICLES

(75) Inventors: Ge Wang, Solon, OH (US); Benjamin Galizio, Kent, OH (US)

(73) Assignee: Tremco Incorporated, Beachwood, OH (US)

( * ) Notice: Subject to any disclaimer, the term of this patent is extended or adjusted under 35 U.S.C. 154(b) by 1128 days.

(21) Appl. No.: 12/049,585

(22) Filed: Mar. 17, 2008

(65) Prior Publication Data

US 2009/0012227 A1    Jan. 8, 2009

Related U.S. Application Data (60) Provisional application No. 60/896,743, filed on Mar. 23, 2007.

(51) Int. Cl.
  *C08J 3/02* (2006.01)
  *C08J 3/03* (2006.01)

(52) U.S. Cl.
  USPC ............ 524/501; 524/500; 524/502; 524/539

(58) Field of Classification Search
  USPC ................... 524/500, 501, 502, 539
  See application file for complete search history.

(56) References Cited

U.S. PATENT DOCUMENTS

| 4,055,529 | A | * | 10/1977 | Burley ........................ 523/122 |
| 5,334,655 | A | * | 8/1994 | Carlson et al. ................ 524/804 |
| 2003/0232914 | A1 | * | 12/2003 | Devonport et al. ........... 524/501 |

FOREIGN PATENT DOCUMENTS

| EP | 1245643 A2 | 10/2002 |
| EP | 1371693 A2 | 12/2003 |

OTHER PUBLICATIONS

Website printout—Noveon—The Speciality Chemical Innovator; Carboset CR-728 Acrylic Copolymer Emulsion; dated Feb. 2, 2007; 6 pages; http://www.noveon.com/Product.aspx?site=Coatings &searchValue=. . . .
Hare, Protective Coatings, Fundamentals of Chemistry and Composition, Co-Solvents as Coalescing Agents for Latex, 1994, Technology Publishing Company, Pittsburgh, PA., pp. 390-392.
European Search Reported from EP Application No. 081532210.0-2109 dated Oct. 28, 2009.

* cited by examiner

*Primary Examiner* — Ling Choi
*Assistant Examiner* — Darcy D LaClair Lynx
(74) *Attorney, Agent, or Firm* — Calfee, Halter & Griswold, LLP (57) ABSTRACT

The mechanical properties of a polymer protective coating formed from an aqueous dispersion of a polymer having a low glass transition temperature are significantly improved by including in the dispersion solvent softened polymer nanoparticles made from a polymer having a high glass transition temperature.

18 Claims, 6 Drawing Sheets

AQUEOUS POLYMER DISPERSIONS MODIFIED WITH SOLVENT-SOFTENED NANOPARTICLES

CROSS-REFERENCE TO RELATED APPLICATION

This application is based on provisional application Ser. No. 60/896,743, filed Mar. 23, 2007, the benefit of which is hereby claimed and the disclosure of which is hereby incorporated herein by reference.

BACKGROUND AND SUMMARY

Aqueous polymer dispersions are widely used for providing protective polymer coatings in a variety of different applications. Examples include latex paints, watererproofing emulsions for roofs, foundations and other building structural members, caulks and other sealants. Typically, the polymers used to make such aqueous polymer dispersions have low glass transition temperatures, since this helps make the protective coating formed tough and coherent.

In accordance with this invention, the mechanical properties of protective polymer coatings made from an aqueous polymer dispersion, especially those made from a polymer having a lower glass transition temperature, are improved by including in the dispersion solvent softened nanoparticles which are made from a polymer having a higher glass transition temperature.

Thus, this invention provides an aqueous polymer dispersion comprising an aqueous dispersion of primary polymer particles formed from a polymer having a lower glass transition temperature, the aqueous dispersion further containing solvent softened polymer nanoparticles formed from a polymer having a higher glass transition temperature, the higher glass transition temperature being at least 10° C. higher than the lower glass transition temperature.

In addition, this invention also provides a process for improving the mechanical properties of a polymer protective coating formed from a primary aqueous dispersion of a polymer having a lower glass transition temperature, the process comprising including in the primary aqueous dispersion solvent softened polymer nanoparticles formed from a polymer having a higher glass transition temperature at least 10° C. higher than the lower glass transition temperature in an amount sufficient to improve the mechanical propertied of the protective coating.

In addition, this invention also provides improved polymer protective coatings which are made by depositing the above improved aqueous polymer dispersions on a substrate and allowing the deposited aqueous polymer dispersions to dry.

DETAILED DESCRIPTION

In accordance with this invention, the mechanical properties of a protective polymer coating made from an aqueous dispersion of a polymer having a lower glass transition temperature are improved by including in the dispersion solvent softened nanoparticles of a polymer having a higher glass transition temperature.

DEFINITIONS

"Coalescing Agent" with respect to a particular polymer means a high boiling solvent for that polymer which, when added to an aqueous dispersion of the polymer, acts as a volatile external plasticizer swelling the polymer particles and assisting in the fusion of the particles into a cohesive film. "High boiling" in this context means that the high boiling solvent slowly evaporates after the film is formed. See, Hare, Protective Coatings, *Fundamentals of Chemistry and Composition*, © 1994, Technology Publishing Company, Pittsburg, Pa., page 390. Coalescing agents are also known as "co-solvents."

"Dispersion" means a composition in which particles of a natural or synthetic polymer are dispersed in a liquid medium.

"Emulsion," as used herein, is synonymous with dispersion.

"High glass transition temperature" means a glass transition temperature, $T_g$, which is above 25° C.

"Higher glass transition temperature" refers to a glass transition temperature which is higher than the "lower glass transition temperature" being referred to. Thus, a "higher glass transition temperature" is not necessarily a "high glass transition temperature." For example, a "higher glass transition temperature" can be 15° C. if the "lower glass transition temperature" being referred to is 5° C., even though 15° C. is not a high glass transition temperature.

"Latex" means a stable dispersion of a polymeric substance in an essentially aqueous medium.

"Low glass transition temperature" means a glass transition temperature, $T_g$, which is below 25° C.

"Lower glass transition temperature" refers to a glass transition temperature which is lower than the "higher glass transition temperature" being referred to. Thus, a "lower glass transition temperature" is not necessarily a "low glass transition temperature." For example, a "lower glass transition temperature" can be 30° C. if the "higher glass transition temperature" being referred to is 40° C., even though 30° C. is not a low glass transition temperature.

"Primary" in connection with an aqueous polymer dispersion refers to a dispersion being improved by this invention, or a component of such a dispersion, in contrast to the nanoparticle dispersions and components thereof which are used to improve this primary polymer dispersion according to this invention. Thus, a "primary dispersion" is an aqueous polymer dispersion being improved by this invention, while "primary particles" are the polymer particles forming such a dispersion. Similarly, a "primary polymer" is the polymer forming these primary particles.

"Protective coating" means a coating or other layer of a polymeric substance which is formed on a substrate and whose primary function is to protect the substrate from the effects of the weather. A seal provided by a bead of caulk will be understood to be a "protective coating."

"Solvent" in relation to a particular polymer means a liquid which, when contacted with that polymer after it is formed, partially dissolves, or at least substantially swells, that polymer without being permanently bonded to or incorporated into the polymer. A solvent is therefore different from a plasticizer which remains in, or on, the polymer essentially indefinitely or permanently.

"Waterproofing emulsion" means an aqueous polymer dispersion which provides protective coatings resistant to penetration of liquid water and which is especially formulated for covering roofs and foundations of building structures. A waterproofing emulsion is therefore different from a paint, which is formulated primarily for providing permanently colored protective coatings on walls. In addition, it is also different from a sealant or caulk, which is a material of generally higher viscosity intended to be laid down as bead in a crack or opening.

Primary Aqueous Polymer Dispersions

This invention is directed to improving the mechanical properties of protective polymer coatings derived from primary aqueous polymer dispersions, especially those formed from polymers having low glass transition temperatures.

When the liquid phase of a primary polymer dispersion evaporates, the dispersed polymer particles coalesce into a polymer particle film or coating. If this polymer (i.e., the primary polymer) has a low glass transition temperature, $T_g$, these primary polymer particles bind together, thereby forming a tough, coherent film. If the primary polymer has a high glass transition temperature, these polymer particles do not bind together and coherent coatings will not normally form.

Protective coatings can be formed from polymers having high glass transition temperatures, but special approaches are needed. For example, the polymer can be dissolved in an organic solvent and the solution obtained used for coating purposes. However, this approach is environmentally unfriendly. Where aqueous dispersions are desired, a plasticizer can be incorporated into the polymer when it is formed. This softens the polymer particles enough so that they bind together during film formation which, in turn, causes the coatings formed to be coherent. However, the plasticizer remains bonded to or incorporated in the polymer essentially permanently. The result is that the properties of the polymer remain altered essentially permanently. Thus, the advantage of using a polymer having a high glass transition temperature is at least partially lost, because the "effective" glass transition temperature of the polymer is lowered by this approach essentially permanently.

Coalescing agents can also be used for making aqueous dispersions of high glass transition temperature polymers film forming. Coalescing agents, which are high-boiling liquids having some solvating effect on the polymer, function similarly to plasticizers in that they also soften the polymer particles enough so that they bind together thereby forming a coherent coating. Coalescing agents are different than plasticizers in that coalescing agents slowly evaporate over time. The result is that the coalescing agents do not remain a permanent part of the coating that has formed. As a result, the polymer forming the coating at least partially returns to its original, higher glass transition temperature.

Coalescing agents are not normally added to aqueous dispersions of low glass transition temperature polymers, since such dispersions are film forming on their own—no special additive being necessary.

This invention is applicable to essentially any type of aqueous primary polymer dispersion, both as supplied from the manufacturer as well as in the form of final products such as latex paints, waterproofing emulsions, caulks and sealants. Normally, the polymer used in forming the dispersion will have a low glass transition temperature, $T_g$, i.e., a glass transition temperature below 25° C. Polymers with glass transition temperature of 20° C. or below, 10° C. or below, 0° C. or below, −10° C. or below, −20° C. or below, −30° C. or below, −40° C. or below, or even −50° C. or below, are interesting. There is really no lower limit to the glass transition temperature, since any commercially available aqueous polymer dispersion can be used.

As well appreciated in the art, the particular primary polymer dispersion to be used in a particular application depends on many factors including the desired mechanical properties of the protective coating to be formed, especially its hardness, strength and flexibility (elongation), at the ultimate use temperatures to be encountered. As further appreciated in the art, the glass transition temperature of the polymer forming the dispersion plays an important role in determining these mechanical properties. Therefore, it is desirable when selecting the particular polymer dispersion to use in a particular application to choose a dispersion whose polymer has a glass transition temperature which is appropriate for that application. So, for example, when a protective roof coating is to be formed in a colder climate where temperatures in winter can reach −20° C. (−4° F.), polymers having glass transition temperatures of −30° C. (−22° F.) or even lower might be selected so that the protective roof coating formed still remains flexible at these low temperatures. On the other hand, in climates where the temperature rarely drop below 10° C. (50° F.), polymers with higher glass transition temperatures can be used. All of this is well known to those skilled in the art, who should have no difficulty in selecting particular primary aqueous polymer dispersions for particular applications.

The average particle size of the polymer particles in the primary aqueous polymer dispersions used in this invention can vary widely and essentially any average particle size can be used. Normally, the average particle size will be above the nanoparticle size range, i.e. above about 100 nm, although nanoparticle dispersions can also be used. In addition, the average particle size will also normally be below about 10μ (micron), more typically below about 5μ. Normally, the dispersed primary polymer particles will have an average particle size of about 0.1 to 2μ, more typically about 0.2 to 1μ or even about 0.3 to 0.7μ.

The primary polymer dispersions useful in this invention can be any aqueous polymer dispersion previously used for forming protective coatings. For example, aqueous polymer dispersions based on acrylic resins, SBR resins (styrene-butadiene rubber), modified SBR, polychloroprene resins, 2-chlorobutadiene, SA resins (styrene-acrylics), NBR resins (nitrile-butadiene rubber) can be used. They are available from a wide variety of sources around the world such as Noveon, Inc. of Brecksville, Ohio, BASF of Ludwigshafen, Germany, Eliochem, Inc. of Akron, Ohio, The Dow Chemical Company of Midland, Mich. 48674, and Rohm and Haas Company of Philadelphia, Pa., to name just a few.

A particularly interesting type or class of primary polymer dispersions are those based on acrylic polymers, i.e., polymer and copolymers containing at least about 10 wt. % of one or more polymerized monomers selected from $C_1$-$C_{12}$ alkyl (meth)acrylates, more typically $C_1$-$C_4$ alkyl (meth)acrylates and especially methyl methacrylate. In this context, "(meth) acrylate" means acrylate, methacrylate or both. Copolymers of such alkyl (meth)acrylates can be composed of two or more of these alkyl (meth)acrylates and can also contain up to about 90 wt. %, more typically up to about 70 wt. %, of one or more additional copolymerizable monomers such as ethylene, propylene and other mono-unsaturated hydrocarbons having up to 12 carbon atoms, vinyl monomers such as vinyl chloride, vinylidene chloride, styrene, α-methyl styrene and other vinyl aromatics containing no more than about 12 carbon atoms. Such polymers may also include comonomers providing cross-linking sites such as butadiene, isoprene and other multifunctional vinyl monomers as well as alkali and alkaline earth metal salts of acrylic and methacrylic acid, for example.

As indicated above, this invention is applicable to essentially any type of aqueous primary polymer dispersion, both as supplied from the manufacturer as well as in the form of final products such as latex paints, waterproofing emulsions, caulks and sealants. As well understood in the art, these final products normally contain a variety of additional ingredients depending on the particular application for which they are intended. Examples include pigments, pigment extenders, dyes, fillers including light weight fillers such as cotton and/or other cellulosic fibers, wetting agents, thixotropic agents, coalescing agents, plasticizers, fire retardants, defoaming agents, and other additives. In addition, they are formulated with different solids concentrations so as to produce coatings which dry and cure over different periods of time to produce final dried coatings of different thicknesses.

For example, latex paints are typically formulated with pigments, fillers and other ingredients to provide continuous, permanently colored, cured protective coatings on the order of 2 to 10 mils thick within two hour or so of application, whether applied by brush or spray. Therefore, they are typically formulated to contain about 15 to 50 vol. %, more typically about 25 to 45 vol. %, solids, including the dispersed polymer resin.

In contrast, waterproofing emulsions are typically formulated to provide thicker continuous, cured protective coatings, e.g., on the order of 10-80 mils (~0.25-2 mm) thick, more typically, at least about 20, 30 or even 40 mils (~0.5, ~0.75, ~1.0 mm) thick, when applied by brush or spray. They may take as long as two days or even longer to dry and cure, and color permanence is not normally an issue. Therefore, waterproofing emulsions typically contain about 10 to 80 wt. %, more typically about 40 to 65 wt. %, and even about 45 to 60 wt. % solids, including an emulsified polymer resin, and normally have viscosities on the order of about 500 to 85,000 cps, more typically about 2,000 to 50,000 cps and even about 7,500 to 30,000 cps. They typically contain about 10 to 50 wt. % polymer solids, depending on the other ingredients present.

Meanwhile, caulks and other sealants are formulated to form beads as thick as 3/8 inch (375 mils, ~9.5 mm), or even thicker, when applied by extrusion from a tube, with drying and curing typically occurring in less than 24 hours. Color permanence may or may not be an issue, depending on the particular application intended. Therefore, caulks and other sealants typically contain higher solids contents, typically about 50 wt. % or more, more typically about 75 wt. % or more.

The particular type and quantity of additional ingredients to include in a particular product for use in a particular desired application is also well known to those skilled in the art, who should also have no difficulty in selecting these other ingredients for use in a particular applications of this invention.

Polymer Nanoparticles

In accordance with this invention, the mechanical properties of a protective polymer coating made from an aqueous primary polymer dispersion, especially a dispersion made from a primary polymer having a lower glass transition temperature, are improved by including in the dispersion solvent softened nanoparticles of a polymer having a higher glass transition temperature, the higher glass transition temperature being at least 10° C. higher than the lower glass transition temperature.

As indicated above, when the liquid phase of a primary polymer dispersion evaporates, the dispersed primary polymer particles coalesce and bind together to form a tough, coherent coating, provided that the temperature at which the coherent coating is formed is above the glass transition temperature of the polymer. Although not wishing to be bound to any theory, it is believed that the improvement in mechanical properties provided by this invention is due to the fact that, when the liquid in the primary polymer dispersion evaporates and the primary particles therein coalesce and form their coherent coating, the solvent softened polymer nanoparticles included in the dispersion according to this invention bind to these primary polymer particles in much the same way as these primary polymer particles bind to themselves. Hence, these solvent softened nanoparticles become an integral part of the coherent coating produced through the formation of distinct mechanical bonds and/or links rather than simply being present as a filler.

However, because the solvent which softens these polymer nanoparticles is not permanently bonded to or incorporated in these nanoparticles, it escapes the coating through evaporation whereby the nanoparticles soon revert to their "original" $T_g$. In other words, the glass transition temperature of the polymer forming these nanoparticles does not remain permanently lowered as would be the case if a plasticizer had been used for softening. Rather, it returns to the higher value of the original, untreated polymer from which the nanoparticles are made. Because of this higher glass transition temperature, the now-rehardened nanoparticles are harder and stronger than the primary particles from which the majority of the protective coating is made. As a result, the mechanical properties of the protective coating in which these nanoparticles are incorporated are also enhanced.

In any event, it has been found that the mechanical properties of protective polymer coatings formed from aqueous dispersions of low $T_g$ polymers can be significantly enhanced by including in the dispersion polymer nanoparticles of higher $T_g$ polymers, provided that these nanoparticles are in a solvent softened condition. In contrast, if these nanoparticles are in an unsoftened condition, the improvement in properties achieved if any is limited to the effect caused by these unsoftened polymer nanoparticles as simple fillers. In other words, this same filler improvement effect can also be achieved by using inert fillers (e.g., clays and the like) of the same size and amount. In contrast, a significantly greater enhancement in mechanical properties is achieved if these high $T_g$ polymer nanoparticles are solvent softened in accordance with this invention.

The polymer nanoparticles which are useful in this invention have an average particle size, before softening, in the nanoparticle range. Accordingly, they normally have an average particle size of 100 nm or less, more commonly 50 nm or less, or 10 nm or less or even 5 nm or less. Polymer nanoparticles with average particle sizes of 2 nm or less or even 1 nm or less are even more interesting. There is no real limit on the minimum average particle size, as this is typically determined by availability.

As indicated above, the polymer forming these nanoparticles, before softening, has a "higher" glass transition temperature than the polymer forming the primary polymer dispersion. In other words, the polymer forming the polymer nanoparticles of this invention, before softening, has a "higher" glass transition temperature, while the polymer forming the primary particles of the primary polymer dispersion has a "lower" glass transition temperature. Normally, the higher glass transition temperature will be at least 10° C. higher than the lower glass transition temperature. However, the higher glass transition temperature can be at least 20° C., at least 30° C., at least 40° C., at least 50° C., or more greater than the lower glass transition temperature.

In this regard, the primary effect of this invention is to increase the mechanical properties, particularly hardness, strength and flexibility (elongation), of protective coatings formed from otherwise conventional aqueous polymer dispersions. This effect can be realized regardless of the particular polymer dispersion used, so long as the glass transition temperature of the polymer forming the nanoparticles is higher than the glass transition temperature of the polymer forming the primary polymer particles by some not insignificant degree. In other words, the effect of this invention can be realized regardless of whether the primary polymer dispersion is made from a polymer which itself has a relatively low glass transition temperatures such as 0° C., −20° C., −40° C., or even lower, or a relatively high glass transition temperatures such as 30° C., 50° C., 70° C., or even higher. This is because it is the relative difference between the lower glass transition temperature of the primary polymer particles and the higher glass transition temperature of the polymer nanoparticles of this invention which drives the improvement achieved.

Most commonly, the polymer nanoparticles that are used in this invention will be made from polymers which, before softening, have glass transition temperatures above 25° C. Polymer nanoparticles made from polymers which before softening have glass transition temperatures of 40° C. or above, 50° C. or above, or 75° C. or above, are more interesting.

As well known in the art, polymer nanoparticles have been produced for decades for use in a variety of high performance materials such as high impact resistant polymers and specialty coatings, long before it was fashionable to use the "nano" label. They can be made by free radical polymerization, controlled radical polymerization (ATRP, RAFT), suspension and dispersion-precipitation polymerization and emulsion polymerization, for example. In addition, more recent advances in chemistry, processing techniques and analytical instrumentation have allowed a whole host of new types of polymer nanoparticles to be made such as, for example, nanoparticles which are hollow, multi-lobed, magnetic, functionalized with reactive groups on the surface, conductive, etc.

Polymer nanoparticles are commercially available from a wide variety of different sources, both as powders and as dispersions, both aqueous and organic. For example, they are available from the same sources identified above for the primary aqueous polymer dispersions, e.g., Noveon, Inc. of Brecksville, Ohio, BASF of Ludwigshafen, Germany, Eliochem, Inc. of Akron, Ohio, The Dow Chemical Company of Midland, Mich. 48674, and Rohm and Haas Company of Philadelphia, Pa., and many others. In addition, they can also be made from essentially any of the polymers from which the primary polymer dispersions can be made, as discussed above, with acrylic polymers being especially interesting. When supplied as aqueous dispersions, they can be formulated to contain about 25 to 75 wt. % dispersed polymer nanoparticles, although concentrations of about 35 to 60 wt. %, and even about 40 to 50 wt. %, dispersed polymer nanoparticles are more typical.

The amount of solvent softened polymer nanoparticles that can be included in the primary aqueous polymer dispersions of this invention can vary widely, and essentially any amount can be used. In general, enough solvent softened polymer nanoparticles should be used to achieve a noticeable improvement in the mechanical properties of the polymer protective coatings obtained. In this regard, excellent results have been obtained using amounts of solvent softened polymer nanoparticles as low as 3 wt. % or less, 1 wt. % or less and even 0.5 wt. % or less, while amounts as low as 0.01 wt. % or less are possible. In terms of maximum concentration, there is no real technical limit on the maximum amount of solvent softened polymer nanoparticles can be used. As a practical matter, however, more nanoparticles necessarily means less primary polymer particles in a given product dispersion and the protective film made from this dispersion. Accordingly, care should be taken to when carrying out specific embodiments of this invention to avoid using so much polymer nanoparticles that the desired properties, characteristics and effects provided by the primary particle dispersion are lost. In any event, amounts of solvent softened polymer nanoparticles as high as 50 wt. % or more can be used to good effect. Amounts of solvent softened polymer nanoparticles of 40 wt. % or more, 30 wt. % or more, 20 wt. %, 10 wt. % or more, or even 5 wt. % or more are more typical. In general, therefore, the amount of softened nanoparticles used will generally be between about 0.1 and 50 wt. %, about 0.5 and 40 wt. % and about 1.0 and 30 wt. %, with amounts between about 2 and 20 wt. % and even about 3 and 10 wt. % being more common.

As explained below, the polymer nanoparticles used in this invention are normally supplied in the form of aqueous polymer dispersions. In addition, it is most convenient to solvent soften these polymer nanoparticles while they remain in such aqueous polymer dispersions. Therefore, it is easier to refer to the concentrations of ingredients in a product aqueous polymer dispersion of this invention in terms of the components used to make this product dispersion rather than the product dispersion itself. Therefore, the weight percents given above for the concentration of the nanoparticles in the product dispersions of this invention are based on the amount of nanoparticle dispersion used to make this product polymer dispersion, before its nanoparticles are softened, with the weight of this nanoparticle dispersion plus the weight of the aqueous primary polymer dispersion to which this nanoparticle dispersion is added being taken as 100 wt. %. Similarly, the weight percents given below for the concentration of organic solvent in the product dispersions of this invention are based on the weight of the nanoparticle dispersion being treated with this solvent being taken as 100 wt. %. So, for example, a product dispersion described as containing 10 wt. % nanoparticles and 10 wt. % solvent will be understood as being made in a weight ratio of 10 grams of nanoparticle dispersion, 90 grams of aqueous primary particle dispersion and 1 gram of solvent.

Solvent

Essentially any organic solvent which softens the polymer nanoparticles and does not adversely impact the mechanical properties of the primary polymer in any significant way can be used in this invention. Such organic solvents may be miscible or compatible with water, if desired. However, this is not necessary, as traditional organic solvents which are completely immiscible with water can also be used. In addition, some or all of the organic solvent may function as a coalescing agent with respect to the polymer nanoparticles, although conventional low-boiling organic solvents, i.e., organic solvents which do not function as coalescing agents, are more typical. Mixtures of different organic solvents can also be used.

Example of solvents which can be used include common solvents such as aromatic and aliphatic (both saturated and unsaturated) hydrocarbon solvents, oxygenated organic solvents, other polar organic compounds and naturally-occurring solvents can be used. Specific examples include mineral spirits, various petroleum fractions such as gasoline, kerosene, jet fuel and the like, esters, organic acids, anhydrides, alcohols, glycols, polyols, glycol ethers, furans, amines, amides, nitrites, turpentine, essential oils, terpenes and the like. More interesting materials are the $C_5$ to $C_{20}$ paraffins, $C_2$ to $C_{16}$ alcohols, $C_3$ to $C_{12}$ glycols, $C_3$ to $C_{12}$ polyols, $C_6$ to $C_{16}$ glycol ethers, N-methylpyrrolidone and its analogs, e.g., pyrrolidones having a hydrogen or $C_{1-4}$ alkyl attached to the nitrogen of the pyrrolidone ring, and lactones, i.e., cyclic esters in which the main ring has four to seven atoms, two of which are provided by the ester group (—CO—O—) and d-limonene. Especially interesting solvents are the $C_9$ to $C_{16}$ normal and iso-paraffins, especially the $C_{10}$ and $C_{11}$ normal paraffins and the $C_9$ to $C_{12}$ iso-paraffins, $C_6$ to $C_{12}$ glycol ethers and d-limonene. Particular examples are hexane, heptane, octane, etc., benzene, toluene, xylene and their derivatives, diethyl ether, chloroform, methyl acetate, ethyl acetate, dichloromethane, 1,4-dioxane, tetrahydrofuran, acetone, acetonitrile, dimethylformamide, dimethyl sulfoxide, acetic acid, n-butanol, isopropanol, n-propanol, ethanol, acetone, PCBTF, methylene chloride, mineral spirits, chlorofluoro hydrocarbons and the ARCOSOLVE line of solvents available from Lyondell Chemical Company, especially the mono-, di- and tri-ethylene and propylene glycol methyl, ethyl, propyl and butyl ethers. DPnP (dipropylene glycol normal propyl ether) is especially interesting.

Preferably, VOC-exempt solvents are used due to their environmentally-friendly nature.

As indicated above, the particular organic solvent used in a particular embodiment of this invention should be capable of softening the polymer nanoparticles when these nanoparticles are present in the primary aqueous polymer dispersion to which they are added. Determining whether the solvency power of a proposed solvent is too little can be done by casting a mixture of the nanoparticles and solvent to be used on a suitable substrate and then allowing the mixture to dry by evaporation of the solvent. If the nanoparticle coating obtained does not hold together, i.e., if this coating is not coherent, the solvent has insufficient solvency power and another solvent should be used.

Whether a proposed solvent has too great a solvency power for a particular application of this invention essentially depends on the primary polymer dispersion being used. In this regard, it has been found that some organic solvents used for softening the nanoparticles, if used in too great an amount, adversely affect the primary polymer dispersion used in this invention, even though the amount of solvent used is very small relative to the amount of primary particle dispersion to which they are added. Accordingly, care should also be taken to avoid combinations of solvents and solvent concentrations where these deleterious effects are realized.

Determining whether a particular amount of a particular solvent is too strong in terms of solvency power can be done by forming a film from the particular primary aqueous polymer dispersion to be used, modified by the addition of the particular solvent to be used in the particular amount to be used. If the mechanical properties of the test film formed in this way are worse than a comparable film formed in the same way from the same amount of unmodified primary polymer dispersion, then the particular solvent used in the particular concentration used adversely affects the primary polymer dispersion and should be avoided. See, Analytical Test No. 1 in the following working examples.

In one embodiment of this invention as further discussed below, solvent softening of the polymer nanoparticles can be done by mixing the solvent directly with the nanoparticles in powder form and then allowing the mixture obtained to sit or rest for a suitable period of time. If an inseparable mass of solvent and nanoparticles is formed when this is done, (i.e., if the mixture turns into "gunk"), then the particular solvent used has too great a solvency for the particular nanoparticles to be used, at least when the two are combined in the particular way tested. So, either a less potent solvent should be used, or a different method selected for combining the solvent and nanoparticles together for solvent softening.

The amount of solvent used for solvent softening in this invention is usually small relative to the product polymer dispersions produced. As shown in the following working examples, the amount of solvent used is typically no more than about 10 wt. %, based on the weight of the aqueous nanoparticle dispersion. Solvent amounts of 5 wt. % or less, 4 wt. % or less, 3 wt. % or less, 2 wt. % or less, 1 wt. % or less, based on the weight of the aqueous nanoparticle dispersion, are more typical. Moreover, as explained above, the amount of nanoparticle dispersions used is normally no more than about 50 wt. % based on the combined weights of the nanoparticle dispersion plus the aqueous primary polymer dispersion being improved. Smaller amounts are more typical. This means that in an embodiment of the invention in which a relatively large amount of solvent (e.g. 10 wt. %) and a large amount of the solvent softened nanoparticles (50 wt. %) are used, the total amount of solvent used is still small relative to the product dispersion obtained (10 wt. %×50 wt. %=5 wt. %). When more typical amounts of solvent and polymer nanoparticles are used, e.g., 3 wt. % solvent and 5 wt. % softened nanoparticles, the total amount of solvent used relative to the product dispersion obtained is quite small (3 wt. %×5 wt. %=0.015 wt. %). Such low amounts of solvent are particularly beneficial where minimizing the VOC content of the product polymer dispersions is desired.

Softening the Polymer Nanoparticles with the Solvent

The easiest way of solvent softening the polymer nanoparticles used in this invention is to mix the selected organic solvent with an aqueous dispersion of the nanoparticles before the nanoparticles are added to the primary aqueous polymer dispersion to be improved. Depending on the solvent and nanoparticles used, sufficient softening will occur if the mixture so formed is allowed to soak overnight. Longer or shorter soaking times, e.g., 6-20 hours, 2 hours to 2 days, 1 hour to 1 week, etc., may be appropriate. If solvents with high solvency power are used, no soaking may be necessary.

In addition to soften, mixing/soaking usually causes the polymer nanoparticles to experience some swelling as well. This may be restricted to the nanoparticle surfaces or extend throughout the entire nanoparticle body depending on various factors including the particular polymer used, its molecular weight, its degree of cross-linking, if any, and the particular solvent selected.

For example, vigorously mixing PC-21, which is an aqueous nanoparticle dispersion having a glass transition temperature of about 90° C. and an average particle size of about 90 nm available from Noveon, Inc. of Brecksville, Ohio, with 5 wt. % DPnP, based on the weight of the nanoparticles, and then allowing the mixture so formed to sit overnight, will soften the polymer nanoparticles to a sufficient degree, even though this organic solvent has little solubility in water. These softened nanoparticles can then be added to a primary aqueous polymer dispersion whether or not the DPnP, or the liquid phase of this nanoparticle dispersion as a whole, is removed first.

Other ways of contacting the organic solvent with the polymer nanoparticle dispersion can also be used. For example, the polymer nanoparticles in powder form can be contacted with the organic solvent. Alternatively, the organic solvent can be added to the primary aqueous dispersion separately from the polymer nanoparticles. Regardless of which particular contacting technique is adopted, a sufficient amount of an organic solvent with appropriate solvency should be used, given the particular method employed for bringing these ingredients together, so that the polymer nanoparticles will effectively soften by the time the primary aqueous polymer dispersion is to be used for forming protective coatings.

In this regard, it will be appreciated that the ability of an organic solvent to soften the polymer nanoparticles depends not only on the identities of the solvent and the polymer nanoparticles used but also on the way in which these ingredients are combined with one another. For example, mixing powdered nanoparticles with 100% solvent will achieve a far greater degree of contact between the nanoparticles and the solvent than separately adding the same amount of solvent and the same amount of nanoparticles to a primary aqueous polymer dispersion. Therefore, care should be taken when adopting particular embodiments of this invention not only to select appropriate combinations of solvent and nanoparticles but also appropriate methods of combining these ingredients as well. Thus, routine experimentation may be necessary to determine the particular solvent to use, as well as the amount of this solvent to use, in view of the particular polymer nanoparticles that are intended to be used as well as the particular method of contacting these nanoparticles with this solvent that is also intended to be used.

WORKING EXAMPLES

In order to describe this invention more thoroughly the following working examples are provided. In these examples, mixtures of selected solvents and selected nanoparticle aqueous dispersions, after sitting overnight to soften the polymer nanoparticles, were added to selected primary aqueous polymer dispersions. These treated primary aqueous polymer dispersions were then used to form films by placing a certain amount of the material in a well of some sort. The amount of material varied depending on the desired film thickness. One example of a well is a plastic can lid. This was done because the mixtures were too thin for making a draw down. Drying of the cast films took at least one week, with one side of the film being exposed to the atmosphere for half the drying time and the other side of the film being exposed to the atmosphere for the other half of the drying time. The tensile strengths of the films so formed were then tested using a modified ASTM D412 Instron testing specification (20 in/min speed, 1 in gauge length) on 3 inch by ½ inch test strips of material. Multiple strips were tested for each sample.

In these examples, the amount of the nanoparticles used is reported in terms of weight percent. As indicated above, these weight percent values will be understood to mean the weight of the nanoparticle dispersion used (prior to solvent softening) to make the final product dispersion as a percentage of the combined weight of this nanoparticle dispersion plus the weight of the primary particle dispersion used to make this final product dispersion. So, for example, a final product dispersion made with 10 grams (unsoftened) nanoparticle dispersion and 90 grams of primary particle dispersion is described in these working examples as containing 10 wt. % nanoparticles, even though this final product dispersion will normally contain additional ingredients making its final weight more than 100 grams. In the same way, the weight percent of solvent used, as further indicated above, will be understood to mean the weight of solvent used relative to the weight of nanoparticle dispersion used. So, for example, if 1 gram of solvent is used to solvent soften the nanoparticles in the above mixture containing 10 grams of nanoparticle dispersion and 90 grams of primary particle dispersion, the weight percent solvent used will be reported as 10 wt. %, since 1 gram is 10% of 10 grams. This convention has been used since it allows the thickness of the final film to be controlled, as the solvent evaporates from the final film formed during drying.

Example 1

Figure 1:
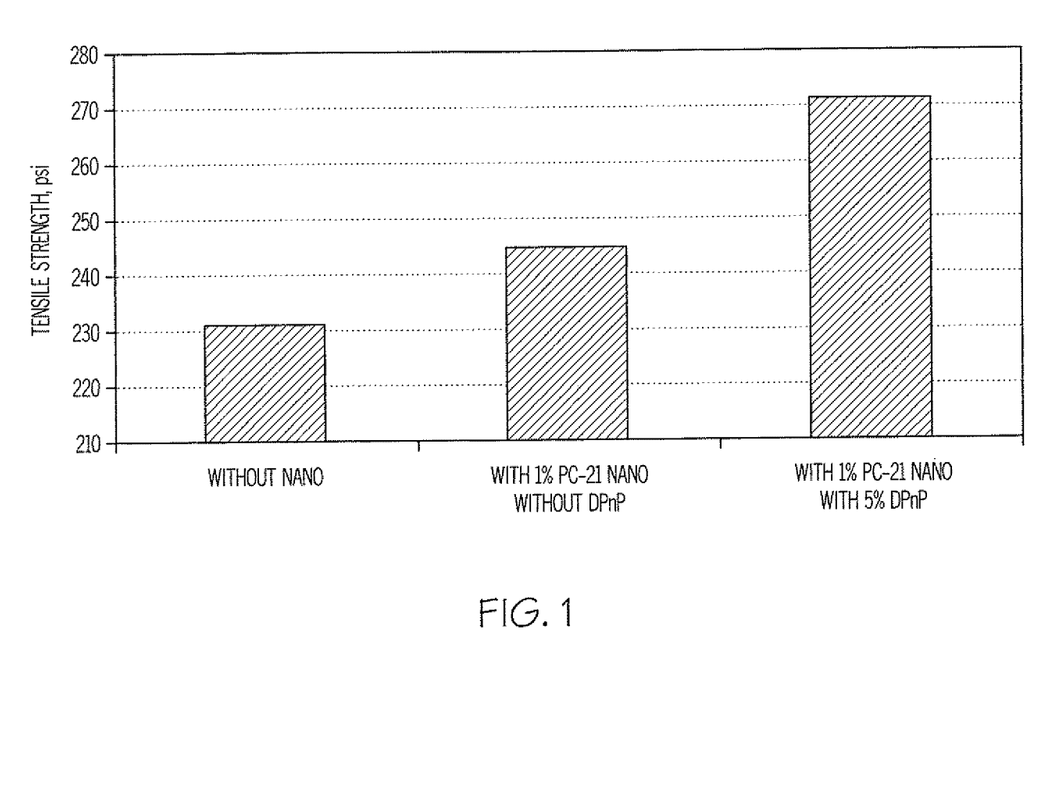
FIG. 1 is a graph illustrating the tensile strength of the polymer film produced by Example 1 below relative to two otherwise identical films made without the solvent softened polymer nanoparticles of this invention.

In this example, El-80, a primary polymer dispersion obtained from Eliochem, Inc. of Akron, Ohio, and being composed of 55 wt. % of dispersed polymer particles having a glass transition temperature of about –45° C. was used to make three different films. One film was made using El-80 as is, i.e., no additional ingredients were added to this primary polymer dispersion. The second film was made in the same way, except that 1 wt. % of PC-21 was added to the El-80 primary polymer dispersion. PC-21 is an aqueous nanoparticle polymer dispersion available from Noveon, Inc. of Brecksville, Ohio, which contains 42 wt. % of dispersed polymer nanoparticles having a glass transition temperature of about 90° C. and an average particle size of about 90 mm. The third film was made in the same way as the second film, except that 5 wt. % DPnP (dipropylene glycol normal propyl ether) based on the amount of PC-21 aqueous nanoparticle dispersion used was added to this nanoparticle dispersion to solvent soften its polymer nanoparticles before this dispersion was combined with the EL-80 primary polymer dispersion. The results obtained are illustrated in the graph of FIG. 1.

As can be seen from this figure, the first film made with the unmodified primary polymer dispersion, i.e., El-80, without anything being added thereto exhibited a tensile strength of 230 psi. In contrast, the second film made with the same primary polymer dispersion modified with 1 wt. % PC-21 nanoparticle dispersion exhibited a tensile strength of 245 psi. This illustrates the "filler effect" of these nanoparticles, i.e., that addition of a small but suitable amount of nanoparticles acting solely as an inert filler improves the mechanical properties of the film obtained. However, the third film made in accordance with this invention in which the PC-21 polymer nanoparticles were solvent softened before being added to the El-80 primary polymer dispersion exhibited a tensile strength of 272 psi, significantly higher than the other two films. This shows that solvent softening the nanoparticles in accordance with this invention substantially increases the ability of these nanoparticles to enhance the mechanical properties of the polymer films in which they are contained, even though the amount of solvent added is very small relative to the product dispersion obtained. (5%×1%=0.05 wt. % of the combined weight of the PC-21 and El-80 used to make this product dispersion)

Example 2

Example 1 was repeated except that
(1) the primary aqueous polymer dispersion used was AE-960, an aqueous dispersion obtained from Noveon Corporation of Brecksville, Ohio, composed of 55 wt. % of dispersed polymer particles having a glass transition temperature of about –25° C.,
(2) the aqueous nanoparticle dispersion was CR-728 obtained from Noveon Corporation of Brecksville, Ohio, which contained 42 wt. % of dispersed polymer nanoparticles having a glass transition temperature of about 55° C. and an average particle size of about 100 nm,
(3) the organic solvent was DPnP (dipropylene glycol normal propyl ether)
(4) the amount of solvent used was 5 wt. %, and (5) the concentration of the polymer nanoparticles varied between 0 and 50 wt. %.

Figure 2:
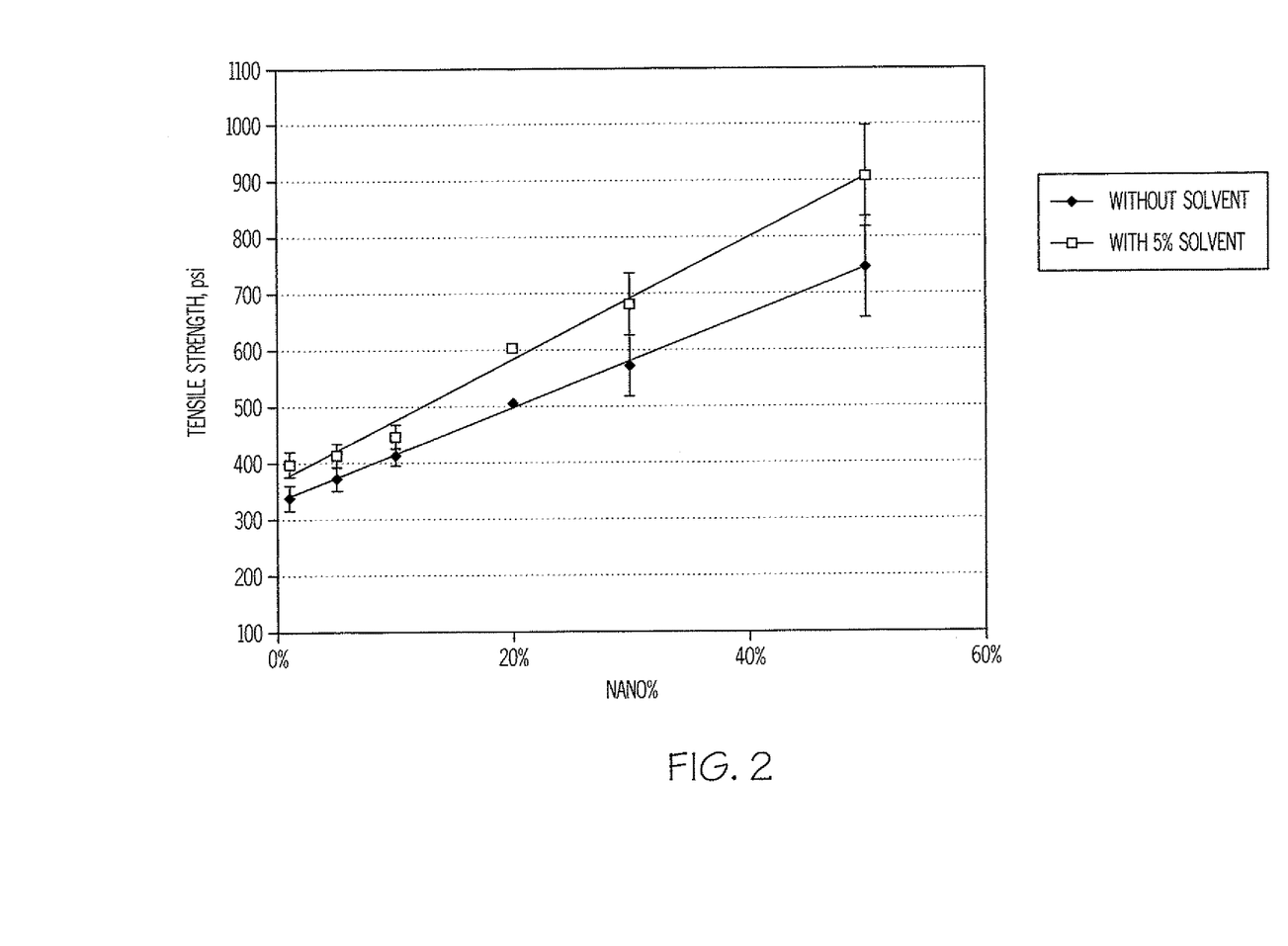
FIGS. 2-5 are graphs similar to FIG. 1 illustrating the tensile strengths of the polymer films described in Examples 2-5 below, relative to otherwise identical films made without the solvent softened polymer nanoparticles of this invention.

The results obtained are graphically illustrated in FIG. 2.

As can be seen from this figure, the tensile strengths of the films obtained in each instance in which the nanoparticles were solvent softened were better than the tensile strengths of the corresponding films obtained when the nanoparticles were unsoftened. Moreover, this improvement was realized regardless of the nanoparticle concentration, at least to a concentration level of up to 50 wt. %. This again demonstrates the significant enhancement in promoting effect achieved by solvent softening polymer nanoparticles of a higher glass transition temperature.

Example 3

Examples 1 and 2 were repeated except that (1) the primary aqueous polymer dispersion used was DM 171, an aqueous dispersion obtained from Dow Chemical Company of Midland, Mich., composed of 50 wt. % of dispersed polymer particles having a glass transition temperature of about −10° C., (2) the nanoparticle dispersion was PC-21, obtained from Noveon, Inc. of Brecksville, Ohio, (3) the organic solvent was DPnP (dipropylene glycol normal propyl ether), and (4) the amount of solvent used was 2 wt. %, and (5) the concentration of the polymer nanoparticles varied between 0 and 30 wt. %.

Figure 3:
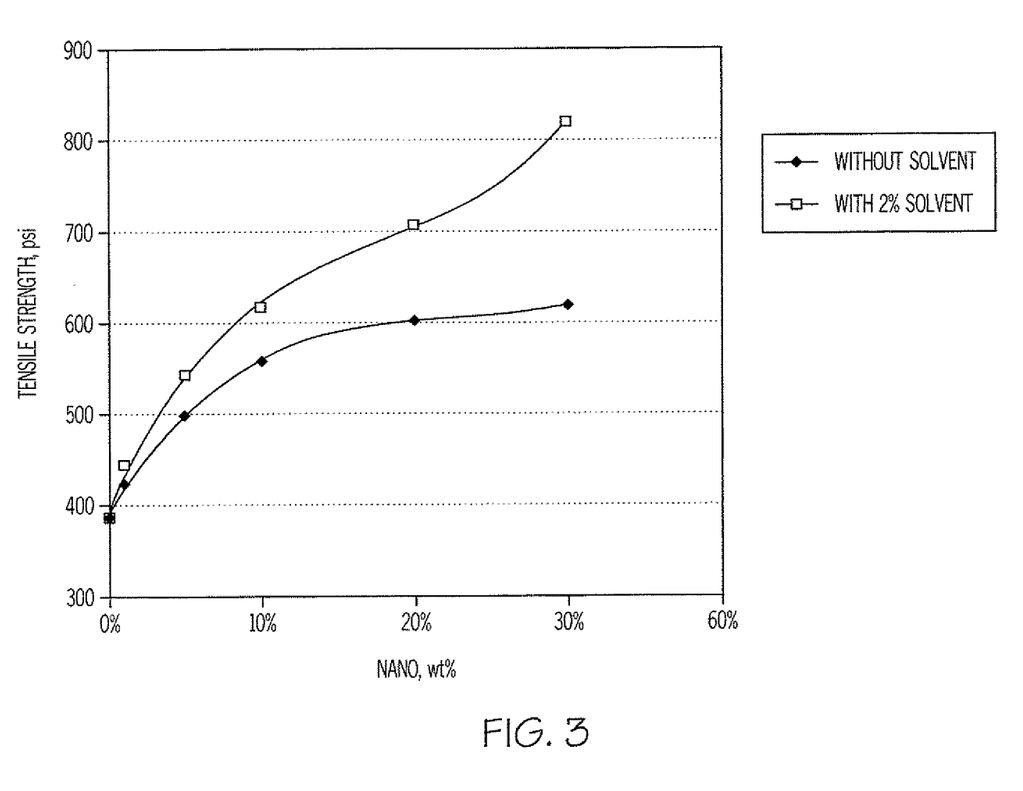

The results obtained are graphically illustrated in FIG. 3.

As can be seen from this figure, the tensile strengths of the films obtained in each example of this invention in which the nanoparticles were solvent softened were better than the tensile strength of the corresponding film obtained when the nanoparticles were unsoftened. This again demonstrates the significant enhancement in promoting effect achieved by solvent softening polymer nanoparticles of a higher glass transition temperature.

Example 4

Examples 1-3 were repeated except that (1) the primary aqueous polymer dispersion used was PA-91, an aqueous dispersion obtained from Eliochem, Inc. of Akron, Ohio composed of 50 wt. % of dispersed polymer particles having a glass transition temperature of about 16° C., (2) the nanoparticle dispersion was PC-21, obtained from Noveon, Inc. of Brecksville, Ohio, (3) the organic solvent was DPnP (dipropylene glycol normal propyl ether), and (4) the amount of solvent used was 2 wt. %, and (5) the concentration of the polymer nanoparticles varied between 0 and 5 wt. %.

Figure 4:
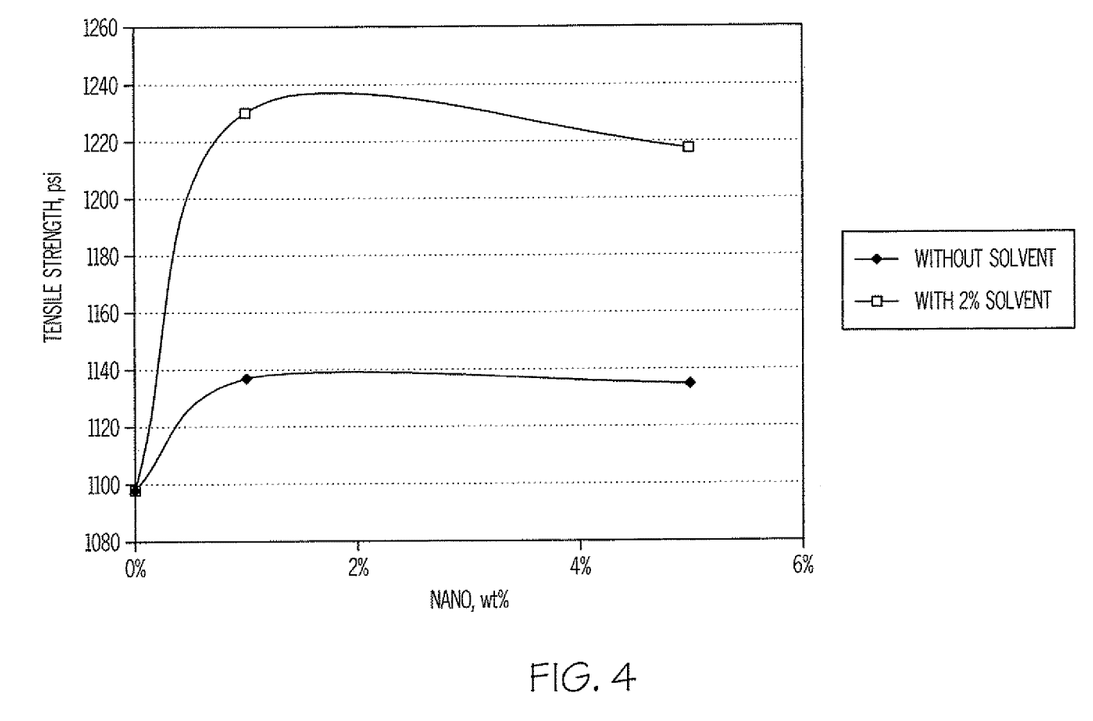

The results obtained are graphically illustrated in FIG. 4.

As can be seen from this figure, the tensile strengths of the films obtained in each example of this invention using solvent softened nanoparticles were better than the tensile strength of the corresponding film obtained when the nanoparticles were unsoftened.

Example 5

Examples 1-3 were repeated except that (1) the primary aqueous polymer dispersion used was UCAR 123 obtained from Rohm & Hass Chemical Company of Philadelphia, Pa., composed of 60 wt. % of dispersed polymer particles having a glass transition temperature of about −17° C., (2) the nanoparticle dispersion was PC-21, obtained from Noveon, Inc. of Brecksville, Ohio, (3) the organic solvent was DPnP (dipropylene glycol normal propyl ether), (4) the amount of solvent used was 2 wt. %, and (5) the concentration of the polymer nanoparticles varied between 0 and 50 wt. %.

Figure 5:
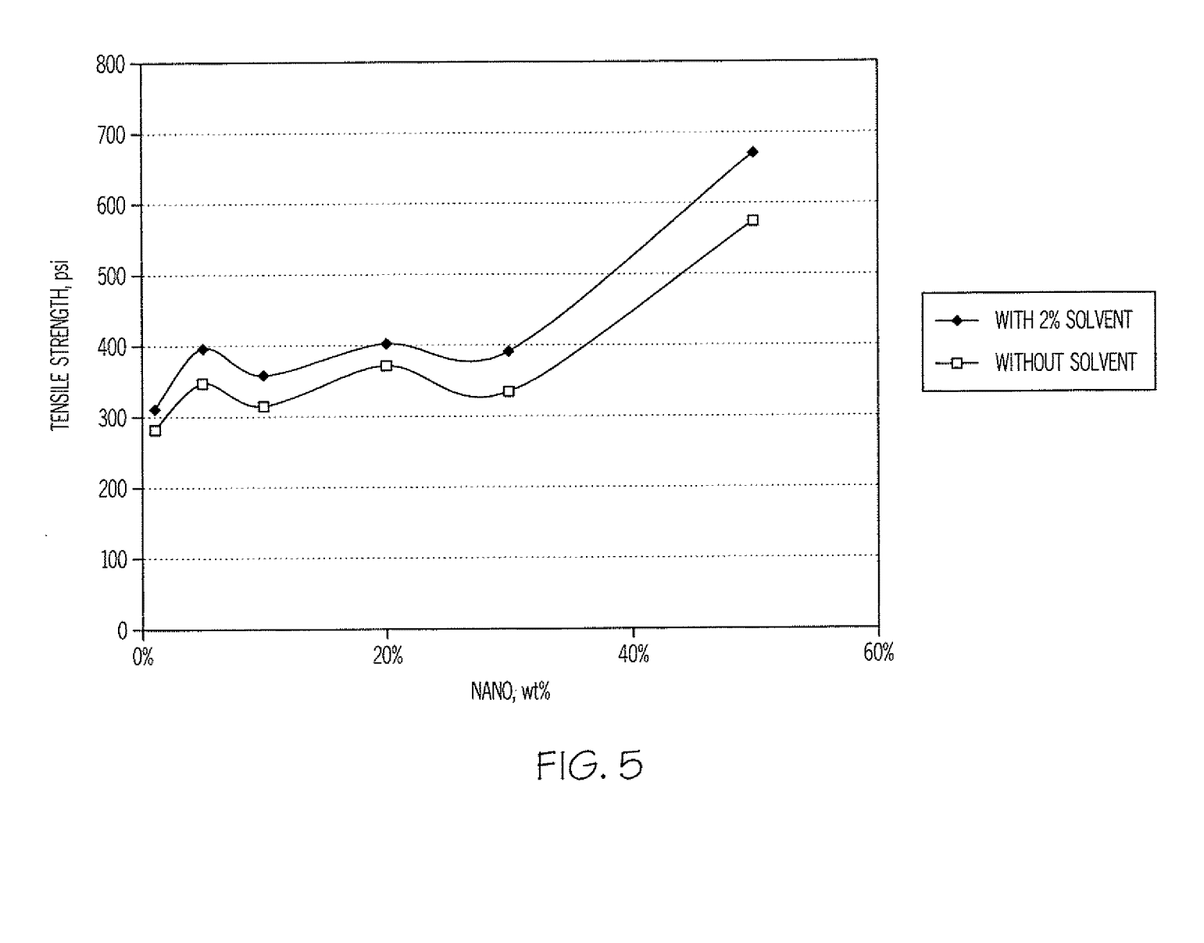

The results obtained are graphically illustrated in FIG. 5.

As can be seen from this figure, the tensile strengths of the films obtained in each example of this invention using solvent softened nanoparticles were better than the tensile strength of the corresponding film obtained when the nanoparticles were unsoftened.

Analytical Test No. 1

To determine if a particular organic solvent, Oxol 100 (parachlorobenzentrifluoride), had a deleterious effect on a particular aqueous primary polymer dispersion, El-80 obtained from Eliochem, Inc. of Akron, Ohio, an analytical test was run in which different amounts of Oxol 100 were added to the different batches of El-80. The modified primary polymer dispersions so formed were then cast into films and the tensile strengths of these test films then determined. The results obtained are graphically illustrated in FIG. 6.

Figure 6:
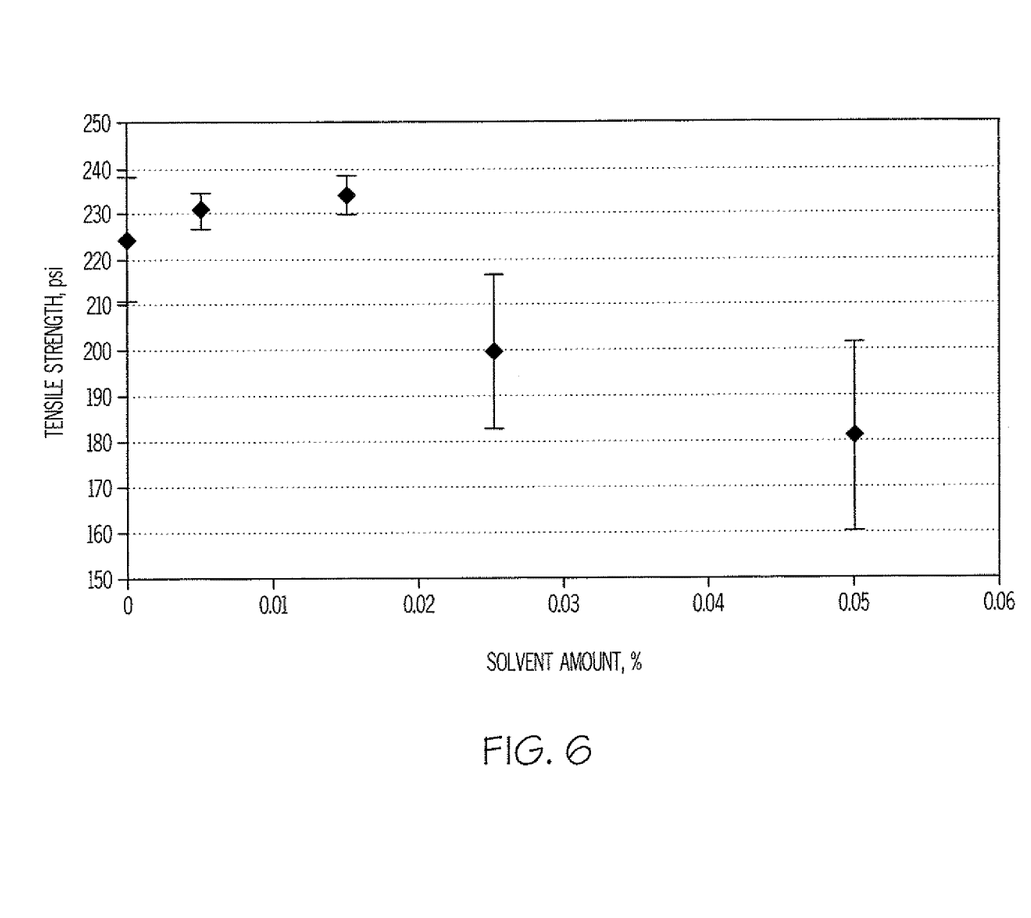
FIG. 6 is a graph illustrating a test that can be used to determine if a particular solvent is appropriate for use in this invention.

As can be seen from this figure, the tensile strengths of the test films produced increased slightly until the Oxol 100 concentration reached a maximum of about 0.015 wt. % (based on the weight of the Oxol 100 used versus the combined weights of the Oxol 100 solvent plus the El-80 primary polymer dispersion), after which the tensile strengths decreased to a neutral value (i.e., a value the same as a film made with no solvent at all) at a concentration level of about 0.02 wt. %. Thereafter, the tensile strengths of the test films decreased even more as the concentration of the Oxol 100 increased further. This shows that at concentration levels exceeding about 0.02 wt. %, this particular solvent exerts an net negative effect on this particular primary polymer dispersion. This further indicates that, in carrying out particular embodiments of this invention in which El-80 is used as the aqueous primary particle dispersion, it may be beneficial to avoid using more than 0.02 wt. % Oxol 100, based on the weight of the product dispersion obtained, for solvent softening. Using no more than about 0.015 wt. % would appear to be even more beneficial.

Although only a few embodiments of this technology have been described above, it should be appreciated that many modifications can be made. All such modifications are intended to be included within the scope of this disclosure, which is to be limited only by the following claims.

The invention claimed is:

1. An aqueous polymer dispersion comprising a mixture of
(a) a primary aqueous dispersion containing primary polymer particles formed from a polymer having a lower glass transition temperature and
(b) solvent softened polymer nanoparticles formed from a polymer having a higher glass transition temperature, the higher glass transition temperature being at least 10° C. greater than the lower glass transition temperature, the polymer nanoparticles being softened with a softening solvent,
wherein the aqueous dispersion is made by a process in which the solvent softened polymer nanoparticles are softened with the softening solvent before being combined with the primary aqueous dispersion so that the amount of softening solvent present in the aqueous polymer dispersion is substantially less than would be present in an otherwise identical aqueous polymer dispersion in which the solvent softened polymer nanoparticles were solvent softened after combining with the primary aqueous dispersion.

2. The aqueous polymer dispersion of claim 1, wherein the solvent softened polymer nanoparticles are made by combining the polymer nanoparticles with a softening solvent, and further wherein the softening solvent is removed from the softened polymer nanoparticles before they are combined with the aqueous primary dispersion.

3. The aqueous polymer dispersion of claim 2, wherein the solvent softened polymer nanoparticles are made by adding the softening solvent to an aqueous nanoparticle dispersion containing the polymer nanoparticles, and further wherein the liquid phase of the nanoparticle dispersion is separated from the solvent softened nanoparticles before the solvent softened nanoparticles are combined with the aqueous primary dispersion.

4. The aqueous polymer dispersion of claim 1, wherein the solvent softened polymer nanoparticles are made by adding the softening solvent to an aqueous nanoparticle dispersion containing the polymer nanoparticles, and further wherein the mixture of softening solvent and aqueous nanoparticle dispersion so made is combined with the primary aqueous dispersion thereby forming the aqueous polymer dispersion.

5. The aqueous polymer dispersion of claim 4, wherein the total amount of softening solvent in aqueous polymer dispersion is 5 wt. % or less based on the weight of aqueous polymer dispersion.

6. The aqueous polymer dispersion of claim 5, wherein the polymer nanoparticles are solvent softened by adding no more than 10 wt. % softening solvent to an aqueous nanoparticle dispersion containing the polymer nanoparticles, the percent being based on the weight of the aqueous nanoparticle dispersion.

7. The aqueous polymer dispersion of claim 6, wherein the polymer nanoparticles are solvent softened by adding no more than 5 wt. % softening solvent to an aqueous nanoparticle dispersion containing the polymer nanoparticles, the percent being based on the weight of the aqueous nanoparticle dispersion, and further wherein the amount of aqueous nanoparticle dispersion combined with the primary particle dispersion is about 0.5 to 40 wt. %, based on the weight of the aqueous polymer dispersion.

8. The aqueous polymer dispersion of claim 7, wherein the amount of aqueous nanoparticle dispersion combined with the primary particle dispersion is about 1.0 to 30 wt. %, based on the weight of the aqueous polymer dispersion.

9. The aqueous polymer dispersion of claim 1, wherein the polymer nanoparticles are solvent softened by allowing a mixture of a softening solvent and an aqueous dispersion of the nanoparticles to soak for 6-20 hours.

10. The aqueous polymer dispersion of claim 1, wherein the higher glass transition temperature is at least 40° C. greater than the lower glass transition temperature.

11. The aqueous polymer dispersion of claim 10, wherein the primary polymer particles are made from a polymer having a glass transition temperature of 10° C. or less.

12. The aqueous polymer dispersion of claim 11, wherein the primary polymer particles have an average particle size of about 0.1 to 2μ, and further wherein polymer nanoparticles, before softening, have an average particle size of 50 nm or less.

13. The aqueous polymer dispersion of claim 1, wherein the aqueous polymer dispersion contains about 0.5 and 40 wt. % softened polymer nanoparticles.

14. The aqueous polymer dispersion of claim 1, wherein polymer nanoparticles are made from an acrylic polymer.

15. The aqueous polymer dispersion of claim 1, wherein the softened polymer nanoparticles are softened by contacting an aqueous dispersion of the polymer nanoparticles with an organic solvent prior to combining the nanoparticles with the primary polymer particles.

16. The aqueous polymer dispersion of claim 1, wherein
the difference between the glass transition temperatures of the polymers forming the primary polymer particles and the polymer nanoparticles, as well as
the amount of polymer nanoparticles included in the aqueous polymer dispersion, as well as
the extent to which the polymer nanoparticles are solvent softened before being combined with the primary polymer particles
are selected so that a protective coating formed from the aqueous polymer dispersion exhibits at least one mechanical property selected from hardness, strength and flexibility which is significantly enhanced relative to an otherwise identical protective coating made from an otherwise identical aqueous polymer dispersion except that the polymer nanoparticles forming this otherwise identical aqueous dispersion are not solvent softened before being combined with the primary polymer particles.

17. The aqueous polymer dispersion of claim 15, wherein the mechanical property is tensile strength.

18. A polymer protective coating formed by depositing the aqueous polymer dispersion of claim 1 on a substrate and allowing the aqueous polymer dispersion to dry.

* * * * *